Dec. 2, 1930.  H. R. JOHNSON  1,783,651
KITCHEN UTENSIL
Filed July 15, 1929  2 Sheets-Sheet 1

INVENTOR.
HOMER R. JOHNSON.
By Alan Franklin
ATTORNEY.

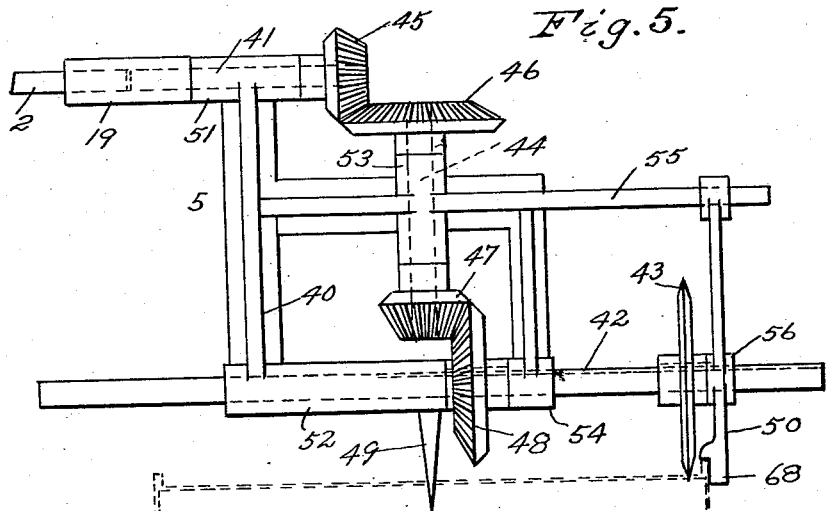
Fig. 5.
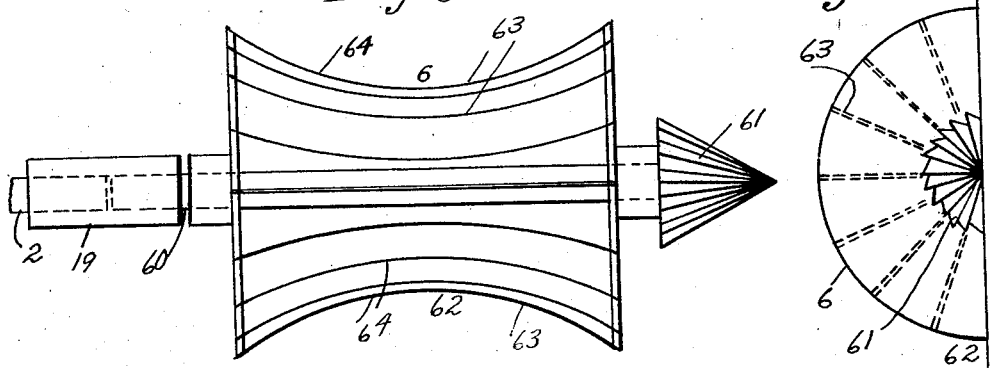
Fig. 6.
Fig. 7.
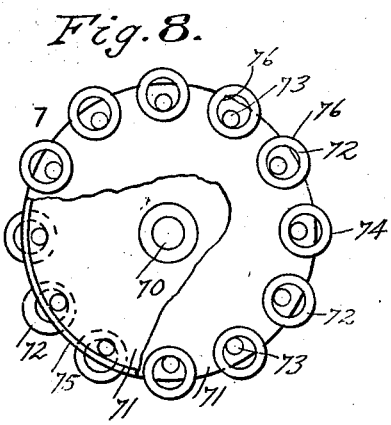
Fig. 8.
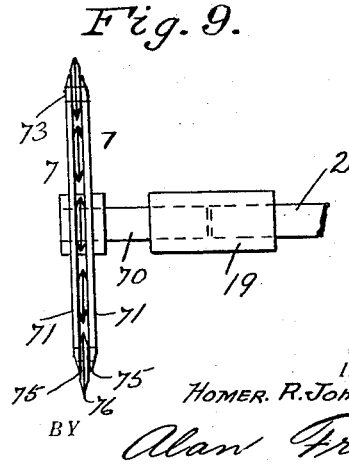
Fig. 9.

Patented Dec. 2, 1930

1,783,651

UNITED STATES PATENT OFFICE

HOMER R. JOHNSON, OF LOS ANGELES, CALIFORNIA

KITCHEN UTENSIL

Application filed July 15, 1929. Serial No. 378,200.

This invention relates to kitchen utensils and more particularly to a utensil for cutting or otherwise preparing foods for consumption.

The general object of the invention is to provide an improved motor-driven kitchen utensil capable of operating a variety of tools for preparing foods of various kinds for consumption.

Other objects and advantages will appear hereinafter.

The invention is illustrated in the annexed drawings which form a part of this specification and in which, Fig. 1 is a side elevation partly in section of my invention.

Fig. 5 is an elevation of a can opener adapted to be operated by my invention.

Fig. 6 is a side view of a potato peeler adapted to be operated by my invention.

Fig. 7 is an end view of Fig. 6.

Fig. 8 is a front view of a meat chopper adapted to be operated by my invention.

Fig. 9 is an edge view of Fig. 8.

Corresponding parts are designated by the same reference characters in all the figures.

Figure 1:
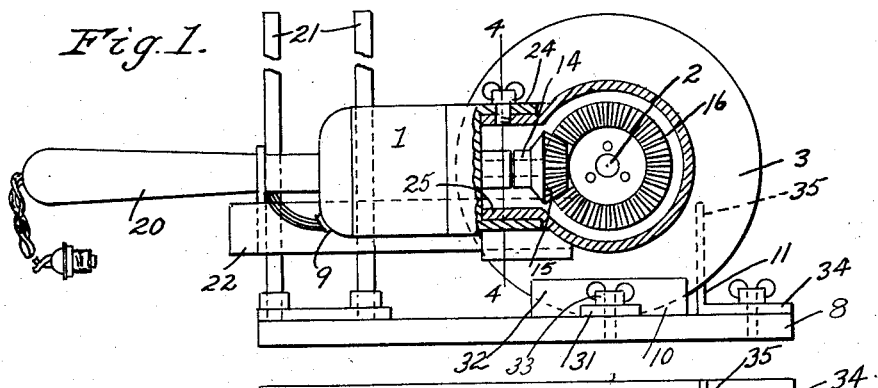
Figure 2:
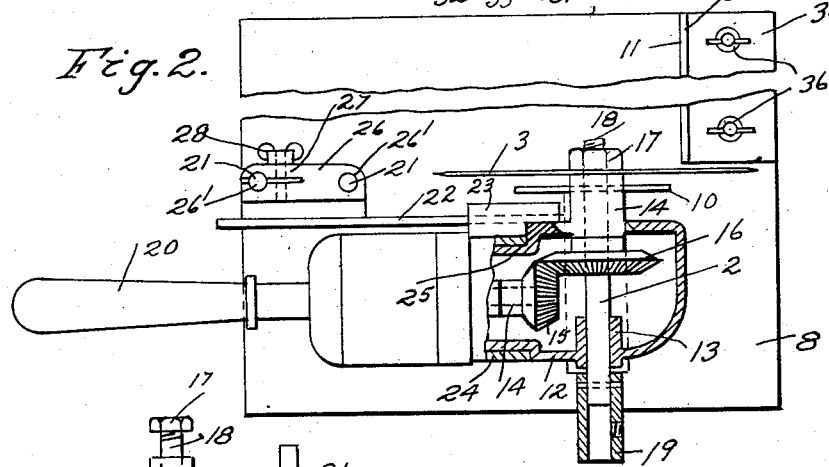
Fig. 2 is a plan view partly in section of my invention.

My invention includes generally a motor 1, a tool shaft 2 driven by said motor, tools 3, 4, 5, 6 and 7, a base plate 8, a mounting 9 on said base plate for said motor, and food guides 10 and 11 adjustably secured on said base plate.

Figure 3:
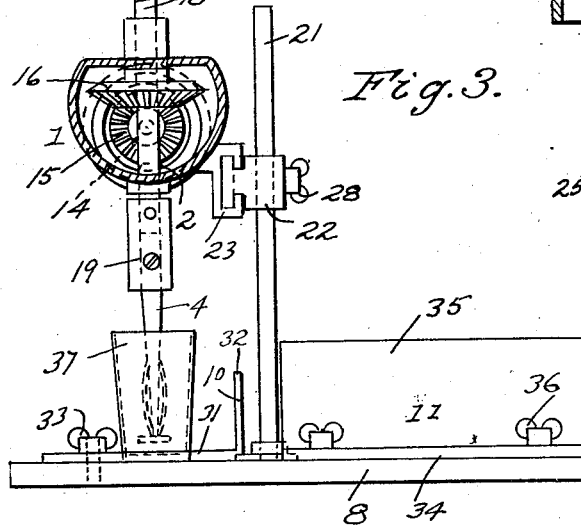
Fig. 3 is an end view of my invention.
Figure 4:
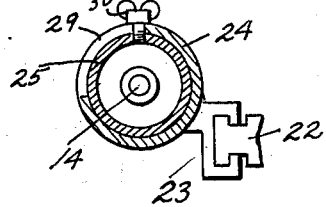
Fig. 4 is a cross section of the motor and its supporting bearing taken on line 4—4 of Fig. 1.

The motor casing 12 is formed with bearings 13 and 14 in which is journaled the tool shaft 2 extending at right angles to the motor shaft 14. On the motor shaft is secured a bevel pinion 15 in mesh with a bevel gear 16 secured on the tool shaft 2, whereby the tool shaft is driven from the motor shaft. The tool 3 may be a disc knife secured on one end of the tool shaft 2 by means of a nut 17 which engages a thread 18 on said shaft end. On the other end of the tool shaft 2 is secured a chuck 19 for holding the tool 4 which may be an egg beater, as shown in Fig. 3, or other tool. The motor 1 has a handle 20 extending from the rear end thereof.

The mounting 9 compresses a pair of standards 21 upstanding from the base plate 8, a horizontal bar 22 adjustably mounted on said standards, and a slide 23 mounted to slide horizontally on said bar and formed with a bearing 24 in which a journal 25, formed on the motor casing 12, is turnably mounted, whereby the motor 1 and all parts mounted on the motor casing are turnably mounted for the purpose hereinafter described. The bar 22 is formed with a mounting member 26 provided with bores 26' through which the standards 20 extend and said mounting member is split at 27 through one of the bores 26' and a set screw 28 is seated in said member extending across said split for clamping the member on the standards, whereby the bar 22 and motor 1 together with the parts mounted thereon, may be adjustably secured on the standards at different elevations. The bearing 24 is provided with a transverse slot 29 through which extends a set screw 30 seated in the motor journal 25, the head of said screw being adapted to engage the bearing for adjustably securing the motor and parts carried thereby in different positions to which the motor may be turned for the purpose hereinafter described.

The motor and tool mounted thereon may be moved up or down on the standards 21, or moved straight forwardly or backwardly on the bar 22, or turned in the bearing 24.

The food guide 10 comprises an angle iron with a horizontal base flange 31 and vertical guide flange 32, the base flange being secured on the base plate 8 by means of thumb bolts 33 with the guide flange 32 spaced the proper distance from the knife 3 for cutting a slice of meat or other food the desired thickness.

The food guide 11 may comprise an angle iron with a horizontal base flange 34 and a vertical guide flange 35, the base flange being secured on the base plate 8 by means of thumb bolts 36 for securing the guide in position for centering the food with relation to the knife 3.

When the tool 3 is used, the motor 1 is turned in the bearing 24 until the tool is raised sufficiently so that the food may be placed under the knife against the guides 10 and 11. The motor is then turned back until the knife engages the food and the motor is then run, which rotates the knife, through the medium of motor shaft 14, bevel pinion 15, bevel gear 16 and tool shaft 2, so that the knife 3 when pressed down against the food and moved forwardly and backwardly by means of the motor handle, will cut the food in slices of a thickness measured by the distance between the guide 10 and the knife.

When it is desired to use the tool 4, the tool is secured in the chuck 19 and introduced in a glass 37, and the glass is placed on the base plate 8 while the motor 1 is turned until the tool shaft 2 and tool 4 extend vertically as shown in Fig. 3. The tool 4 is rotated by the motor through the medium of motor shaft 14, bevel pinion 15, bevel gear 16 and tool shaft 2, whereby an egg may be beaten in a glass 37.

The tool 5 is a can opener comprising mainly a frame 40, a drive shaft 41, a cutter shaft 42, a cutter 43 on shaft 42, a jack shaft 44, intermeshing bevel gears 45 and 46 on said main shaft and jack shaft respectively, intermeshing bevels 47 and 48 on said jack shafts 44 and 42 respectively, a depending centering point 49 and a guide 50. The frame 40 is formed with bearings 51, 52, and 53 in which the shafts 41, 42, and 44 are journaled respectively, there being also an auxiliary bearing 54 in which the cutter shaft 42 is journaled, between which auxiliary bearing and the bearing 52 the bevel gear 48 is positioned. The guide 50 is mounted at its upper end on an arm 55 outstanding from the frame 40 and the guide has a bearing 56 in which the outer end of the cutter shaft 44 is journaled, the guide bearing 56 limiting the outward position of the cutter on the cutter shaft 42. The centering point 49 is projected through the center of the top of a can 57 placed on the base 8 with the lower end 58 of the guide 50 engaging the periphery and upper edge of the can and the cutter 43 engaging the top of the can near its periphery. The drive shaft 41 is secured in the chuck 19 with the motor turned so that the tool shaft 2 is horizontal. Upon running the motor the cutter 43 is rotated from the tool shaft 2 and chuck 19, through the medium of drive shaft 41, bevel gears 45 and 46, jack shaft 44, bevel gears 47 and 48 and cutter shaft 42, while the can is turned around on the base 8 for enabling the cutter 43 to cut the top of the can around its edge.

The tool 6 is a potato and vegetable peeler comprising a shaft 60, a conical bladed cutter point 61 secured on one end of said shaft, and a concave bladed scraper 62 secured on said shaft adjacent said point. The blades 63 of the scraper 62 extend longitudinally of and radially from the center of the scraper and their outer cutting edges 64 are concaved. The end of the shaft 60 opposite the point 61 is secured in the motor chuck 19, while the tool shaft 2 is horizontal and the tool 6 is rotated by the motor through the tool shaft and bevel gears 16 and 15. The point 61 is used for cutting out the eyes while the blades 63 are used for peeling the potatoes.

The tool 7 is a meat chopper and comprises a shaft 70, a pair of cutting discs 71 secured on said shaft, and a plurality of ring cutters 72 hung between said discs on pins 73 secured in the discs so that the cutting edges 74 of said ring cutters project outwardly beyond the cutting edges 75 of the discs 71, the inner diameter 76 of said ring cutters being somewhat larger than the diameter of said pins, so that said ring cutters may be thrown outwardly by centrifugal force to increase the cutting action of the tool when the shaft 70 and discs 71 are rotated at sufficient speed. The shaft 70 is secured in the motor chuck 19 and the tool 8 is rotated by the motor, through the tool shaft 2, for cutting the meat.

I do not limit my invention to the particular forms herein disclosed because it may be embodied in other forms, and it is to be understood that in and by the claims of this specification I intend to cover my invention in whatever form it may be embodied.

Having described my invention I claim:

1. A kitchen utensil comprising a motor, a tool shaft driven by said motor, means for securing a food tool to said tool shaft and means for turnably adjusting said motor on its axis.

2. A kitchen utensil comprising a motor, a tool shaft driven by said motor, means for securing a food tool to said tool shaft, and means for adjustably mounting said motor at different elevations and means for mounting said motor to be moved straight forwardly or backwardly in the direction of its axis.

3. A kitchen utensil comprising a motor, a tool shaft driven by said motor, means for securing a food tool to said tool shaft, means for turnably adjusting said motor and means for mounting the motor to be moved straight forwardly or backwardly.

4. A kitchen utensil comprising a motor, a tool shaft driven by said motor, means for securing a food tool to said tool shaft and means for adjustably mounting said motor at different elevations, means for mounting said motor to be moved straight forwardly or backwardly, and means for turnably adjusting the motor about its axis.

5. A kitchen utensil including a base, a standard upstanding from said base, a horizontal guide bar, means for securing said guide bar on said standard at different elevations, a motor mounted to reciprocate on said bar, a tool shaft driven by said motor, and means for securing a food tool on said tool shaft.

6. A kitchen utensil including a base, a horizontal guide bar, means for mounting said guide bar above said base, a bearing mounted to reciprocate on said bar, a motor mounted to be turned axially in said bearing, means for securing said motor turned to different positions in said bearing, a tool shaft driven by said motor, and means for securing a food tool on said tool shaft.

7. A kitchen utensil as characterized by claim 6 in which the tool shaft extends at right angles to the motor shaft.

8. A kitchen utensil as characterized by claim 6 in which the means for mounting the guide bar is capable of mounting the guide bar at different elevations.

9. A kitchen utensil as characterized by claim 6 in which the means for mounting the guide bar is capable of mounting the guide bar at different elevations and the tool shaft extends at right angles to the motor shaft.

10. A kitchen utensil including a base, a motor mounted to be turnably adjusted on its axis and mounted to reciprocate with relation to said base, a tool shaft extending at right angles to and driven by said motor shaft, and means for securing a food tool on said tool shaft.

HOMER R. JOHNSON.